US012577158B2

(12) United States Patent
Knoebel et al.

(10) Patent No.: US 12,577,158 B2
(45) Date of Patent: Mar. 17, 2026

(54) USE OF POLYOL FOR REDUCING SHRINKAGE OF CONSTRUCTION CHEMICAL COMPOSITIONS

(71) Applicant: SIKA TECHNOLOGY AG, Baar (CH)

(72) Inventors: Markus Knoebel, Coesfeld (DE); Nick Schneider, Billerbeck (DE)

(73) Assignee: SIKA TECHNOLOGY AG, Baar (CH)

( * ) Notice: Subject to any disclaimer, the term of this patent is extended or adjusted under 35 U.S.C. 154(b) by 612 days.

(21) Appl. No.: 18/010,269

(22) PCT Filed: Aug. 17, 2021

(86) PCT No.: PCT/EP2021/072769
§ 371 (c)(1),
(2) Date: Dec. 14, 2022

(87) PCT Pub. No.: WO2022/038105
PCT Pub. Date: Feb. 24, 2022

(65) Prior Publication Data
US 2023/0295043 A1 Sep. 21, 2023

(30) Foreign Application Priority Data
Aug. 20, 2020 (EP) .................................... 20191910

(51) Int. Cl.
*C04B 24/02* (2006.01)
*C04B 28/06* (2006.01)
*C04B 103/56* (2006.01)

(52) U.S. Cl.
CPC ............ *C04B 24/02* (2013.01); *C04B 28/065* (2013.01); *C04B 2103/58* (2013.01)

(58) Field of Classification Search
CPC ... C04B 24/02; C04B 28/065; C04B 2103/58; C04B 28/06; C04B 28/145; C04B 28/16
See application file for complete search history.

(56) References Cited

FOREIGN PATENT DOCUMENTS

| | | |
|---|---|---|
| DE | 693 14 508 T2 | 4/1998 |
| EP | 1 042 391 B1 | 11/2001 |
| EP | 2 468 696 A1 | 6/2012 |
| EP | 2 767 521 A1 | 8/2014 |
| JP | S48-43014 U | 6/1973 |
| JP | 2003-306364 A | 10/2003 |
| KR | 10-0943308 B1 | 2/2010 |
| WO | 2014/053341 A1 | 4/2014 |
| WO | WO-2020144064 A1 * 7/2020 ............. C04B 28/06 |
| WO | 2020/244981 A1 | 12/2020 |

OTHER PUBLICATIONS

Machine Translation of KR 10-0943308 B1 (Year: 2010).*
Nov. 22, 2021 Search Report issued in International Patent Application No. PCT/EP2021/072769.
Feb. 16, 2023 International Preliminary Report on Patentability issued in International Patent Application No. PCT/EP2021/072769.

* cited by examiner

*Primary Examiner* — Anthony J Green
(74) *Attorney, Agent, or Firm* — OLIFF PLC

(57) ABSTRACT

The use of polyol having a functionality of 4 or less and an OH group density of at least 0.033 mol OH per g polyol as a composition for reducing shrinking of construction chemicals on the basis of a hydraulic binder comprising a) alumina cement and/or calcium sulfoaluminate cement, b) calcium sulfate, and c) optionally Portland cement.

17 Claims, No Drawings

USE OF POLYOL FOR REDUCING SHRINKAGE OF CONSTRUCTION CHEMICAL COMPOSITIONS

TECHNICAL FIELD

The present invention relates to the use of polyol having a functionality of 4 or less and an OH group density of at least 0.033 mol OH per g polyol as agents for reducing the shrinkage of construction chemical compositions based on a hydraulic binder. The hydraulic binder here is what is known as a binary or ternary binder, comprising a) aluminate cement and/or calcium sulfoaluminate cement, b) calcium sulfate, and c) optionally portland cement. The present invention relates also to reduced-shrinkage construction chemical compositions comprising binary or ternary hydraulic binders and polyol having a functionality of 4 or less and an OH group density of at least 0.033 mol OH per g polyol and to the use thereof.

PRIOR ART

It has long been known that mineral binder compositions, especially cement-based binder compositions, are subject to a change in volume, usually shrinkage, during the setting and drying process. This change in volume, especially shrinkage, is of great significance to the serviceability, durability, and strength of the hardened building material, since it is for example often the cause of the formation of cracks or bulges in screeds. Cracks allow water, dissolved salts, and air, for example, to penetrate the interior of the concrete, mortar, screed or slurry and to promote for example corrosion in reinforced concrete structures.

The construction industry accordingly employs a wide variety of measures in seeking to ensure dimensional stability and in particular to limit shrinkage through drying to a minimum. Attempts are being made to counteract shrinkage not just through the nature of the construction method and the choice of optimized cement-based binder compositions, but also in recent years increasingly through the addition of additives. The first shrinkage reducers were developed and successfully employed in Japan in the early 1980s. Since then, the use of various shrinkage reducers as additives has become widespread.

For instance, WO 2014/053341 describes a hydraulic composition comprising certain terpene alcohols as shrinkage reducers. WO 2014/053341 also contains an extensive list of literature references in which various alcohols are described as shrinkage reducers.

JP S4-843014 describes the use of glycol or glycerol as a shrinkage reducer in a cement-based binder composition. However, as is known for example from DE 69314508, glycerol in particular acts as a setting accelerator for portland cement-based mixtures.

JP 2003-306364 describes a pulverulent agent for reducing shrinkage, consisting of a sugar alcohol, especially sorbitol and mannitol, and a liquid, organic shrinkage reducer, for example alkoxylated alcohols or alkanolamines.

In the flooring sector inter alia, there has been a trend in recent years toward the use of what are known as binary and ternary binders for the formulation of building materials, for example screeds. Binary binders are in the present case hydraulic binders that comprise or essentially consist of aluminate cement or calcium sulfoaluminate cement and also calcium sulfate. Ternary binders are in the present case hydraulic binders that comprise or essentially consist of aluminate cement or calcium sulfoaluminate cement, calcium sulfate, and portland cement. Binary and ternary binders have the particular advantage of a shorter time until they are ready for covering compared to binders based on normal cement. This means it is possible within a shorter time to continue working, which is a key economic advantage. Binary and ternary binders often also have the additional characteristic feature of less shrinkage than binders based on normal cement.

However, for many applications, for example screeds, the shrinkage of construction chemical compositions based on binary or ternary binders is still too high. Ways and means are therefore needed to reduce further the shrinkage of such construction chemical compositions.

SUMMARY OF THE INVENTION

An object of the present invention is therefore to reduce the shrinkage of construction chemical compositions based on hydraulic binders comprising
- a) aluminate cement and/or calcium sulfoaluminate cement,
- b) calcium sulfate, and
- c) optionally portland cement.

A further object of the present invention is to provide construction chemical compositions based on hydraulic binders compositions comprising
- a) aluminate cement and/or calcium sulfoaluminate cement,
- b) calcium sulfate, and
- c) optionally portland cement
that exhibit reduced shrinkage.

It has surprisingly been found that the objects of the present invention can be achieved by using at least one polyol having a functionality of 4 or less and an OH group density of at least 0.033 mol OH per g polyol.

In particular, it has been found that the use of at least one polyol having a functionality of 4 or less and an OH group density of at least 0.033 mol OH per g polyol in a construction chemical composition based on a hydraulic binder comprising
- a) aluminate cement and/or calcium sulfoaluminate cement,
- b) calcium sulfate, and
- c) optionally portland cement
significantly reduces the shrinkage of said construction chemical composition compared to an identical construction chemical composition that does not contain such polyol or without the addition of at least one such polyol.

It is particularly advantageous that the shrinkage of a construction chemical composition is under various climatic conditions reduced by the use according to the invention of at least one polyol having a functionality of 4 or less and an OH group density of at least 0.033 mol OH per g polyol. For example, the shrinkage of a construction chemical composition according to the invention is reduced in the range from 5° C. to 50° C. and especially at 20° C. to 30° C. and a relative humidity of 55% to 90%.

It is a further advantage of the present invention that polyols having a functionality of 4 or less and an OH group density of at least 0.033 mol OH per g polyol do not contribute significantly to the emission of VOCs (volatile organic substances) from the construction chemical compositions. In particular, the use of such polyols does not substantially increase the TVOC (total volatile organic substance) content. This is an important advantage over other commercially available shrinkage reducers.

A further advantage of the use according to the invention of at least one polyol having a functionality of 4 or less and an OH group density of at least 0.033 mol OH per g polyol as a shrinkage reducer is that this does not significantly alter the processability of construction chemical compositions. In particular, the water requirement, i.e. the amount of water needed to establish a specific flowability, of a construction chemical composition comprising at least one such polyol is not higher than the water requirement of the same construction chemical composition without such polyols.

Ways of Executing the Invention

In a first aspect, the present invention therefore relates to the use of at least one polyol having a functionality of 4 or less and an OH group density of at least 0.033 mol OH per g polyol for reducing the shrinkage of a construction chemical composition based on a hydraulic binder comprising a) aluminate cement and/or calcium sulfoaluminate cement, b) calcium sulfate, and c) optionally portland cement.

It is particularly preferable to use just one polyol, the polyol having a functionality of 4 or less and an OH group density of at least 0.033 mol OH per g polyol.

The term "shrinkage" is in the present case understood as meaning the reduction in volume of a construction chemical composition during the setting and drying process. The shrinkage of a construction chemical composition can in the present case be measured in accordance with standard EN 13872:2004-04. A reduction in shrinkage means in the present case that the use according to the invention of at least one polyol having a functionality of 4 or less and an OH group density of at least 0.033 mol OH per g polyol in a construction chemical composition results in the shrinkage of said construction chemical composition during the setting and drying process being less than the shrinkage of the same construction chemical composition without the use of such polyols.

Polyols that can be used in the context of the present invention are characterized by a) a functionality of 4 or less and b) an OH group density of at least 0.033 mol OH per g polyol.

The functionality of the polyols corresponds here to the amount of OH groups in moles per mole of substance. The functionality of the polyols is preferably greater than 1, in particular greater than 2.

The OH group density of the polyols is calculated from the functionality of the polyol concerned divided by its molar mass. According to particular embodiments, the polyols according to the invention have an OH group density of 0.033 mol OH per g polyol.

In the context of the present invention, the term "polyol" always means a polyol as defined above, i.e. a polyol having a functionality of 4 or less and an OH group density of at least 0.033 mol OH per g polyol.

Particularly suitable polyols in the context of the present invention are glycerol and erythritol.

Glycerol is used here to refer to chemicals that essentially consist of propane-1,2,3-triol. In particular, glycerol is propane-1,2,3-triol. In the context of the present invention, it is possible to use glycerol from natural sources, for example produced by saponification or transesterification of fats and oils, for instance in biodiesel production, from synthetic sources, for example produced by a petrochemical route, or obtained from fermentation processes. According to particular embodiments, glycerol having a purity of at least 80%, preferably at least 85%, especially at least 90% or at least 95% is in the present case used. Glycerol has a functionality of 3 and an OH group density of 0.033 mol OH groups per g glycerol.

Erythritol is used here to refer to chemicals that essentially consist of butene-1,2,3,4-tetrol. An alternative name for erythritol is 1,2,3,4-tetrahydroxybutane. In particular, erythritol essentially consists of (2S,3R)-butane-1,2,3,4-tetrol, but other stereoisomers may also be present. In the context of the present invention, erythritol may originate for example from sources obtained through chemical catalysis or from sources involving the microbial transformation of sugars. According to particular embodiments, erythritol having a purity of at least 80%, preferably at least 90%, especially at least 95% or at least 99% is in the present case used. Erythritol is in the present case preferably used in powder form. Erythritol has a functionality of 4 and an OH group density of 0.033 mol OH groups per g erythritol.

A hydraulic binder is in the present case a binder that in the presence of water sets and hardens in a hydration reaction, with the formation of solid hydrates or hydrate phases. The hydrates formed are preferably not water-soluble. In particular, the hydration reactions take place essentially irrespective of the water content. This means that a hydraulic binder can harden and retain its strength even when exposed to water, for example under water or in high humidity.

An aluminate cement is in the present case a cement having a main phase consisting of hydraulic calcium aluminates, the main phase preferably being CA ($CaO \cdot Al_2O_3$). Depending on the aluminate cement, other calcium aluminates such as CA2, C3A, C12A7 are also present. Aluminate cements of the present invention typically also contain other phases selected from belite (C2S), tricalcium silicate, ferrites (C2F, C2AF, C4AF), and ternesite (C5S2$). Aluminate cements of the present invention may additionally contain calcium carbonate. In particular, an aluminate cement of the present invention conforms to the standard EN 14647:2006-01. Another term for aluminate cements of the present invention is "aluminous cement". Calcium aluminate cement is a particularly commonly used type of aluminate cement and is especially preferred in the context of the present invention. Suitable aluminate cements can be obtained commercially for example from Kerneos SA or Royal White Cement.

A calcium sulfoaluminate cement (CSA) of the present invention is a cement having a main phase consisting of C4(A3-xFx)3$ (4 $CaO \cdot 3$-x $Al_2O_3 \cdot x$ $Fe_2O_3 \cdot CaSO_4$), where x is an integer from 0 to 3. CSA of the present invention typically comprise other phases selected from aluminates (CA, C3A, C12A7), belite (C2S), ferrites (C2F, C2AF, C4AF), ternesite (C5S2$) and calcium sulfate. According to particular embodiments, CSA of the present invention contains 25-75% by weight of ye'elimite (C4A3$), 0-10% by weight of aluminates, 0-70% by weight of belite, 0-35% by weight of ferrites, and 0-20% by weight of ternesite, in each case based on the total dry weight of the CSA cement. Suitable CSA can be obtained commercially for example from Heidelberg Cement AG, Vicat SA, or under the trade name Calumex from Caltra BV.

In the context of the present invention, calcium sulfate is understood as meaning both anhydrite ($CaSO_4$) and also calcium sulfate hemihydrate ($CaSO_4 \cdot \frac{1}{2}H_2O$) and calcium sulfate dihydrate ($CaSO_4 \cdot 2H_2O$). Calcium sulfate hemihydrate includes alpha- and beta-calcium sulfate hemihydrate. Calcium sulfate of the present invention can be based on either FGD gypsum, phosphogypsum or on natural gypsum. In preferred embodiments, alpha-calcium sulfate hemihydrate is used.

The term "portland cement" is in the present case understood as meaning a cement of type CEM I, CEM II, CEM III, CEM IV or CEM V according to the standard EN 197-1: 2018-11. A portland cement can also be a mixture of these cement types. Portland cements described in alternative standards, for example ASTM standards or Chinese standards, are equally suitable. The clinker content in a portland cement of the present invention is preferably at least 65% by weight based on the total dry weight of the cement. In particular embodiments of the present invention, the clinker content is at least 80% by weight based on the total dry weight of the cement.

According to particular embodiments, the hydraulic binder includes other binders besides aluminate cement or calcium sulfoaluminate cement, calcium sulfate, and optionally portland cement. These are especially latently hydraulic binders and/or pozzolanic binders. Examples of suitable latently hydraulic and/or pozzolanic binders are natural pozzolans, foundry sand, fly ash, silica dust and/or burnt shale. According to particular embodiments, the hydraulic binder contains 6-35% by weight of latently hydraulic and/or pozzolanic binders.

According to embodiments, the hydraulic binder comprises the following constituents:
  a) aluminate cement and/or calcium sulfoaluminate cement,
  b) calcium sulfate, and
  c) optionally portland cement.

Aluminate cement is preferred to calcium sulfoaluminate cement or mixtures of aluminate cement and calcium sulfoaluminate cement.

According to preferred embodiments, the hydraulic binder essentially consists of the following constituents:
  a) aluminate cement and/or calcium sulfoaluminate cement,
  b) calcium sulfate, and
  c) optionally portland cement.

Aluminate cement is preferred to calcium sulfoaluminate cement or mixtures of aluminate cement and calcium sulfoaluminate cement.

According to embodiments, the hydraulic binder essentially consists of the following constituents:
  a) aluminate cement,
  b) calcium sulfate, and
  c) optionally portland cement.

In a particular embodiment, the present invention thus relates to the use of at least one polyol having a functionality of 4 or less and an OH group density of at least 0.033 mol OH per g polyol for reducing the shrinkage of a construction chemical composition based on a hydraulic binder consisting of
  a) aluminate cement,
  b) calcium sulfate, and
  c) optionally portland cement.

In a construction chemical composition comprising a hydraulic binder that comprises or essentially consists of aluminate cement and/or calcium sulfoaluminate cement, calcium sulfate, and portland cement, the weight ratio of aluminate cement and/or calcium sulfoaluminate cement to portland cement is preferably 10:1 to 1:10, more preferably 4:1 to 1:5, very particularly preferably from 3:1 to 1:3, especially from 3:1 to 1:1.

The proportion of calcium sulfate in the hydraulic binder is according to the present invention advantageously within a range of from 1-80% by weight, preferably 10-75% by weight, in each case based on the total dry mass of the hydraulic binder.

According to embodiments, the hydraulic binder therefore essentially consists of the following constituents (in each case based on the total dry mass of the binder):
  a) aluminate cement and/or calcium sulfoaluminate cement,
  b) 1-80% by weight, preferably 10-75% by weight, of calcium sulfate, and
  c) optionally portland cement.

In such hydraulic binders, the weight ratio of aluminate cement and/or calcium sulfoaluminate cement to portland cement, if present, is advantageously within a range of from 10:1 to 1:10, more preferably 4:1 to 1:5, very particularly preferably from 3:1 to 1:3, especially from 3:1 to 1:1.

It has been found that the use of at least one polyol having a functionality of 4 or less and an OH group density of at least 0.033 mol OH per g polyol in a construction chemical composition comprising aluminate cement and/or calcium sulfoaluminate cement and portland cement in these ratios, results in a particularly large reduction in shrinkage.

In a particular embodiment, glycerol is used to reduce the shrinkage of a construction chemical composition based on a hydraulic binder comprising
  a) aluminate cement,
  b) 1-40% by weight, preferably 5-33% by weight, especially 10-26% by weight, of calcium sulfate, and
  c) portland cement,
wherein the weight ratio of aluminate cement to portland cement is within a range of from 10:1 to 1:10, more preferably 4:1 to 1:5, very particularly preferably from 3:1 to 1:3, especially from 3:1 to 1:1.

In a further particular embodiment, erythritol is used to reduce the shrinkage of a construction chemical composition based on a hydraulic binder comprising
  a) aluminate cement and/or calcium sulfoaluminate cement,
  b) 1-80% by weight, preferably 10-75% by weight, of calcium sulfate, and
  c) optionally portland cement,
wherein, when portland cement is present, the weight ratio of aluminate cement and/or calcium sulfoaluminate cement to portland cement is within a range of from 10:1 to 1:10, more preferably 4:1 to 1:5, very particularly preferably from 3:1 to 1:3, especially from 3:1 to 1:1.

It is preferable that no glycerol is used when calcium sulfoaluminate cement is present.

It has been found that the dosage of polyol needed to reduce the shrinkage of a construction chemical composition of the invention depends on the amount of aluminate cement and/or calcium sulfoaluminate cement present. If portland cement is present, the dosage of polyol needed depends also on the weight ratio of aluminate cement and/or calcium sulfoaluminate cement to portland cement.

Polyol is preferably used in an amount of at least 0.5% by weight, preferably 1.0% by weight, more preferably at least 1.2% by weight, based on the amount of aluminate cement and/or calcium sulfoaluminate cement.

In addition, polyol is preferably used in an amount of not more than 10% by weight, preferably not more than 6.5% by weight, based on the amount of aluminate cement and/or calcium sulfoaluminate cement.

It has been found that the reduction in shrinkage of a construction chemical composition at such polyol dosage levels is particularly pronounced. It has also been found that polyol at these dosage levels does not contribute substantially to the development of VOCs.

In a further aspect, the present invention relates to a reduced-shrinkage construction chemical composition comprising a) a hydraulic binder comprising
        a1) aluminate cement and/or calcium sulfoaluminate cement,
        a2) calcium sulfate, and
        a3) optionally portland cement, and
    b) at least one polyol having a functionality of 4 or less and an OH group density of at least 0.033 mol OH per g polyol.

Aluminate cement is here preferred to calcium sulfoaluminate cement or mixtures of aluminate cement and calcium sulfoaluminate cement.

In one embodiment, the reduced-shrinkage construction chemical composition comprises 5-70% by weight, preferably 30-65% by weight, based on the total mass of the construction chemical composition, of a hydraulic binder comprising aluminate cement and/or calcium sulfoaluminate cement and also calcium sulfate.

In a preferred embodiment, the reduced-shrinkage construction chemical composition comprises 5-70% by weight, preferably 30-65% by weight, based on the total mass of the construction chemical composition, of a hydraulic binder consisting of aluminate cement and/or calcium sulfoaluminate cement and also calcium sulfate, especially consisting of aluminate cement and calcium sulfate. The binder is in this case a binary binder.

In a further embodiment, the reduced-shrinkage construction chemical composition comprises 5-70% by weight, preferably 30-65% by weight, based on the total mass of the construction chemical composition, of a hydraulic binder comprising aluminate cement and/or calcium sulfoaluminate cement, calcium sulfate, and portland cement. Such a reduced-shrinkage construction chemical composition is characterized in that the hydraulic binder comprises aluminate cement and/or calcium sulfoaluminate cement and also portland cement in a weight ratio of aluminate cement and/or calcium sulfoaluminate cement to portland cement of from 10:1 to 1:10, more preferably 4:1 to 1:5. very particularly preferably from 3:1 to 1:3, especially from 3:1 to 1:1.

In a further preferred embodiment, the reduced-shrinkage construction chemical composition comprises 5-70% by weight, preferably 30-65% by weight, based on the total mass of the construction chemical composition, of a hydraulic binder consisting of aluminate cement and/or calcium sulfoaluminate cement, calcium sulfate, and portland cement, especially consisting of aluminate cement, calcium sulfate, and portland cement. The binder is in this case a ternary binder. Such a reduced-shrinkage construction chemical composition is characterized in that the hydraulic binder comprises aluminate cement and/or calcium sulfoaluminate cement, preferably aluminate cement, and also portland cement in a weight ratio of aluminate cement and/or calcium sulfoaluminate cement to portland cement of from 10:1 to 1:10, more preferably 4:1 to 1:5. very particularly preferably from 3:1 to 1:3, especially from 3:1 to 1.1.

In a further preferred embodiment, the polyol of the reduced-shrinkage construction chemical composition is selected from glycerol or erythritol.

In further embodiments, the reduced-shrinkage construction chemical composition comprises polyol, selected in particular from glycerol or erythritol, in an amount of at least 0.5% by weight, preferably at least 1.2% by weight, based on the amount of aluminate cement and/or calcium sulfoaluminate cement.

In further embodiments, the reduced-shrinkage construction chemical composition comprises polyol, selected in particular from glycerol or erythritol, in an amount of not more than 10% by weight, preferably not more than 6.5% by weight, based on the amount of aluminate cement and/or calcium sulfoaluminate cement.

In one embodiment, the reduced-shrinkage construction chemical composition comprises a) 5-70% by weight, preferably 30-65% by weight, in each case based on the total mass of the construction chemical composition, of a hydraulic binder comprising
        a1) aluminate cement,
        a2) calcium sulfate, and
        a3) portland cement,
        wherein the weight ratio of aluminate cement to portland cement is within a range of from 10:1 to 1:10, more preferably 4:1 to 1:5, very particularly preferably from 3:1 to 1:3, especially from 3:1 to 1:1, and
    b) 0.5-10% by weight, preferably 1.2-6.5% by weight, of glycerol, based on the amount of aluminate cement.

In a further embodiment, the reduced-shrinkage construction chemical composition comprises a) 5-70% by weight, preferably 30-65% by weight, in each case based on the total mass of the construction chemical composition, of a hydraulic binder comprising
        a1) aluminate cement,
        a2) 1-40% by weight, preferably 5-33% by weight, especially 10-26% by weight, in each case based on the total dry mass of the binder, of calcium sulfate, and
        a3) portland cement,
        wherein the weight ratio of aluminate cement to portland cement is within a range of from 10:1 to 1:10, more preferably 4:1 to 1:5, very particularly preferably from 3:1 to 1:3, especially from 3:1 to 1:1, and
    b) 0.5-10% by weight, preferably 1.2-6.5% by weight, of glycerol, based on the amount of aluminate cement.

In a further embodiment, the reduced-shrinkage construction chemical composition comprises a) 5-70% by weight, preferably 30-65% by weight, in each case based on the total mass of the construction chemical composition, of a hydraulic binder comprising
        a1) aluminate cement,
        a2) calcium sulfate, and
        a3) optionally portland cement,
        wherein, when portland cement is present, the weight ratio of aluminate cement to portland cement is within a range of from 10:1 to 1:10, more preferably 4:1 to 1:5, very particularly preferably from 3:1 to 1:3, especially from 3:1 to 1:1, and
    b) 0.5-10% by weight, preferably 1.2-6.5% by weight, of erythritol, based on the amount of aluminate cement.

In a further embodiment, the reduced-shrinkage construction chemical composition comprises a) 5-70% by weight, preferably 30-65% by weight, in each case based on the total mass of the construction chemical composition, of a hydraulic binder comprising a1) aluminate cement, a2) 1-40% by weight, preferably 5-33% by weight, especially 10-26% by weight, in each case based on the total dry mass of the binder, of calcium sulfate, and a3) optionally portland cement, wherein, when portland cement is present, the weight ratio of aluminate cement to portland cement is within a range of from 10:1 to 1:10, more preferably 4:1 to 1:5, very particularly preferably from 3:1 to 1:3, especially from 3:1 to 1:1, and b) 0.5-10% by weight, preferably 1.2-6.5% by weight, of erythritol, based on the amount of aluminate cement.

Construction chemical compositions according to the invention may also comprise aggregates. Aggregates may be any material that is not reactive in the hydration reaction of hydraulic binders. Examples of typical aggregates are rock, crushed stone, gravel, slag, sand, especially quartz sand or river sand, ground rock, recycled concrete, glass, expanded glass, hollow glass beads, glass ceramics, volcanic rock, pumice stone, perlite, vermiculite, quarry waste, porcelain, electrically fused or sintered abrasives, firing auxiliaries, silica xerogels and/or fine aggregates such as ground limestone, ground dolomite and/or ground alumina. Aggregates useful in the present invention may be of any shape and size typically encountered for such aggregates. A particularly preferred aggregate is sand. Sand is a naturally occurring granular material composed of finely divided rock or mineral particles. It is obtainable in various shapes and sizes. Examples of suitable sands are quartz sand, limestone sand, river sand or crushed rock aggregates. Suitable sands are described for example in the standards ASTM C778 or EN 196-1.

According to preferred embodiments, at least some of the aggregate used for a construction chemical composition of the present invention is quartz sand, river sand, ground rock, for example ground granite or limestone, or mixtures thereof. According to a preferred embodiment, river sand is used for a construction chemical composition of the present invention, since it is chemically inert, solid, available in various sizes, and the processability of the composition can be advantageously adjusted. Sand is normally supplied in various fractions of particles that pass through a screen having open holes. Depending on the execution, a construction chemical composition of the present invention employs sand in which 99% of particles have a size of 1 mm or less, preferably of 0.8 mm or less, in particular 0.6 mm or less, in each case measured according to ASTM C136/136M. Larger particles can result in inadequate mixing.

Depending on the embodiment, the construction chemical composition may additionally include fillers, which are selected in particular from carbonate fillers, preferably in the form of calcium carbonate such as powdered limestone, or dolomite.

A construction chemical composition of the present invention comprises, depending on the embodiment, 10-80% by weight, preferably 25-75% by weight, more preferably 30-70% by weight, in each case based on the dry weight of the construction chemical composition, of aggregates and/or fillers.

A particularly suitable quartz sand has a grading curve within a range from about 0 to 0.5 mm, preferably within a range from about 0.08 to 0.4 mm. A further suitable quartz sand has a grading curve within a range from about 0.1 to 1 mm, preferably from about 0.2 to 0.8 mm. A suitable fine calcium carbonate has an average particle size D50 within a range of about 10-50 μm. A suitable limestone powder has a fineness of <0.1 mm.

The particle size of fine particles can be determined by laser diffraction as described in ISO 13320:2009. In particular, a Mastersizer 2000 instrument with a Hydro 2000G dispersing unit and the Mastersizer 2000 software from Malvern Instruments GmbH (Germany) is used. A suitable measuring medium is for example isopropanol. A particle size of nonspherical or irregular particles is preferably represented by the equivalent sphere diameter of a sphere of equivalent volume. The average particle size of fine particles corresponds in the present case to the D50 value (50% of the particles are smaller than the specified value, 50% are accordingly larger). Fine particles are particles having a D50 value of less than or equal to 0.1 mm.

The grading curve of coarse particles can be determined by sieve analysis, as described for example in the standard ASTM C136/C136M. This process separates fine particles from coarser particles by passing the material through a series of screens having different mesh sizes. The result can be reported as the percentage of particles that pass through a screen of a particular size. The specification of a grading curve means hereinbelow that the corresponding aggregate consists of particles having a particle size within the specified limits.

In addition to the constituents already mentioned, the building material composition may also comprise other customary constituents, especially flow agents, thickeners, dyes and/or color pigments, defoamers, air-pore formers, stabilizers, retardants, accelerators, activators, fibers, chromium(VI) reducers, and/or flexibilizers. By adding such additives that are known per se, it is for example possible to improve the leveling properties and rheological behavior and tailor them to the requirements in the particular case, to suppress foam formation, and to retard solidification (hardening). The total concentration of such additives is expediently between 0.1-10% by weight, preferably between 0.5-5% by weight, and more preferably between 1-3% by weight, in each case based on the total mass of the composition.

It is in the context of the present invention particularly preferable that the construction chemical composition does not contain any further organic shrinkage reducers. In particular, a construction chemical composition of the present invention does not contain any glycols, alkoxylated alcohols or alkanolamines.

Suitable flow agents are selected in particular from the group consisting of lignosulfonates, sulfonated vinyl copolymers, polynaphthalene sulfonates, sulfonated melamine-formaldehyde condensates, polyethylene oxide phosphonates, polycarboxylate ethers or esters (PCEs) or mixtures thereof. In particular embodiments, a building composition of the present invention comprises at least one PCE. Suitable PCEs are described for example in EP 2468696. Such PCEs are particularly suitable for permitting good processability of the building material composition, even ones having a low water content.

According to particular embodiments, a building material composition according to the invention additionally comprises at least one thickener selected from the group consisting of starch, pectin, amylopectin, modified starch, cellulose, modified cellulose, such as carboxymethyl cellulose, hydroxymethyl cellulose, hydroxyethyl cellulose, methyl hydroxyethyl cellulose, casein, xanthan gum, diutan gum, welan gum, galactomannans such as guar gum, tara gum, fenugreek gum, locust bean gum or cassia gum, alginate, gum tragacanth, dextran, polydextrose, phyllosilicates such as sepiolite, bentonite or vermiculite, and mixtures thereof. Particularly suitable thickeners are hydroxyethyl celluloses.

A building material composition according to the invention comprises, depending on the embodiment, at least one retardant selected from the group consisting of sugar acids, sugars, sugar alcohols, hydroxycarboxylic acids or salts thereof, phosphates, phosphonates, borates, and amines. The retardant is preferably selected from the group consisting of gluconic acid, citric acid, tartaric acid or the respective sodium salts thereof.

According to particular embodiments, a building material composition according to the invention additionally comprises a synthetic organic polymer, especially a synthetic organic copolymer, that is chemically different from the flow agents mentioned above. A synthetic organic polymer in the context of this invention may be produced by free-radical polymerization of monomers selected from the group consisting of ethylene, propylene, butylene, isoprene, butadiene, styrene, acrylonitrile, acrylic acid, methacrylic acid, esters of acrylic acid, esters of methacrylic acid, vinyl esters, and vinyl chloride. It is preferable that synthetic organic polymers are copolymers synthesized from two or more, preferably two different, monomers. The order of the monomers in the copolymer may be alternating, in blocks, or random. Preferred synthetic organic polymers are copolymers of vinyl acetate and ethylene, vinyl acetate and ethylene and methyl methacrylate, vinyl acetate and ethylene and vinyl esters, vinyl acetate and ethylene and acrylic esters, vinyl chloride and ethylene and vinyl laureate, vinyl acetate and vinyl versatate, acrylic esters and styrene, acrylic esters and styrene and butadiene, acrylic esters and acrylonitrile, styrene and butadiene, acrylic acid and styrene, methacrylic acid and styrene, styrene and acrylic esters, styrene and methacrylic esters. The glass transition temperature (Tg) of the synthetic organic polymers mentioned may vary within a wide range. In particular, it is also possible for the synthetic organic polymer to be present in the form of a redispersible polymer powder. The term redispersible polymer powder refers to a powder that contains a polymer and forms a stable dispersion when immersed in water. A redispersible polymer powder comprises not just the polymer, but typically also mixtures thereof with, for example, protective colloids, emulsifiers, and carrier materials. Redispersible polymer powders can be produced for example by spray-drying of polymer dispersions, as described for example in patent application EP 1042391. Suitable redispersible powders are available for example from Wacker Chemie AG under the trade name Vinnapas.

Depending on the embodiment, the building material composition according to the invention may additionally comprise fibers, especially steel, glass, plastic and/or cellulose fibers. Glass fibers and/or plastic fibers are preferred. Particularly preferred plastic fibers are polyalkylene fibers, for example polyethylene fibers.

It is readily apparent to the person skilled in the art that the amounts of the individual constituents in the building material composition according to the invention may vary within wide ranges depending on the intended use and depend in particular also on the application. For a thick layer of the building material composition according to the invention, a content of hydraulic binder within a range of about 5-45% by weight, in particular about 25-40% by weight, in each case based on the total dry mass of the building material composition, is for example sufficient, while the content of fillers can in this case be greater and in particular within a range of about 50-80% by weight, preferably about 55-70% by weight, and more preferably about 60-65% by weight, in each case based on the total dry mass of the building material composition. For a thin layer of the building material composition according to the invention, a higher proportion of binder is on the other hand expediently selected, in particular within a range of about 45-70% by weight, preferably about 50-60% by weight, in each case based on the total dry mass of the building material composition, while the proportion of filler is correspondingly lower and is in particular within a range of about 30-50% by weight, preferably about 40-45% by weight, in each case based on the total dry mass of the building material composition. A thick layer refers in the context of this invention to a layer of 10 mm or more, preferably 20 mm or more, up to 60 mm or more. A thin layer is accordingly a layer that is less than 10 mm thick and preferably has a thickness in the range from 1 to 6 mm.

In a further aspect, the present invention therefore relates to a reduced-shrinkage construction chemical composition comprising, in each case based on the total dry mass of the construction chemical composition, a) 5-70% by weight, preferably 30-65% by weight, of a hydraulic binder comprising
        a1) aluminate cement and/or calcium sulfoaluminate cement,
        a2) calcium sulfate, and
        a3) optionally portland cement,
    b) at least one polyol having a functionality of 4 or less and an OH group density of at least 0.033 mol OH per g polyol,
    c) 10-80% by weight, preferably 25-75% by weight, more preferably 30-70% by weight, of aggregates, in particular sand, and/or fillers, in particular fine calcium carbonate, and
    e) optionally additives selected from the group consisting of accelerators, retardants, flow aids, rheological aids, thickeners, pigments, and biocides.

Aluminate cement is here preferred to calcium sulfoaluminate cement or mixtures of aluminate cement and calcium sulfoaluminate cement.

According to particular embodiments, a construction chemical composition according to the invention consists, in each case based on the total dry mass of the construction chemical composition, of a) 5-70% by weight, preferably 30-65% by weight, of a hydraulic binder comprising
        a1) aluminate cement and/or calcium sulfoaluminate cement,
        a2) calcium sulfate, and
        a3) optionally portland cement,
    b) 0.5-10% by weight, preferably 1.2-6.5% by weight, in each case based on the amount of aluminate cement, of polyol, selected in particular from glycerol or erythritol,
    c) 10-80% by weight, preferably 25-75% by weight, more preferably 30-70% by weight, of aggregates, in particular sand, and/or fillers, in particular fine calcium carbonate, and
    e) optionally additives selected from the group consisting of accelerators, retardants, flow aids, rheological aids, thickeners, pigments, and biocides.

According to further particular embodiments, a construction chemical composition according to the invention consists, in each case based on the total dry mass of the construction chemical composition, of a) 5-70% by weight, preferably 30-65% by weight, of a hydraulic binder comprising a1) aluminate cement and/or calcium sulfoaluminate cement, a2) calcium sulfate, and a3) optionally portland cement, b) 0.5-10% by weight, preferably 1.2-6.5% by weight, in each case based on the amount of aluminate cement, of polyol, selected in particular from glycerol or erythritol, c) 10-80% by weight, preferably 25-75% by weight, more preferably 30-70% by weight, of aggregates, in particular sand, and/or fillers, in particular fine calcium carbonate, and e) 0.1-10% by weight of additives selected from the group consisting of accelerators, retardants, flow aids, rheological aids, thickeners, pigments, and biocides.

According to further embodiments, a reduced-shrinkage construction chemical composition consists of a) 5-70% by weight, preferably 30-65% by weight, in each case based on the total mass of the composition, of a hydraulic binder comprising a1) aluminate cement and/or calcium sulfoaluminate cement, a2) 1-40% by weight, preferably 5-33% by weight, especially 10-26% by weight, in each case based on the total dry mass of the binder, of calcium sulfate, and a3) optionally portland cement, wherein the weight ratio of aluminate cement and/or calcium sulfoaluminate cement to portland cement, if present, is within a range of from 10:1 to 1:10, more preferably 4:1 to 1:5, very particularly preferably from 3:1 to 1:3, especially from 3:1 to 1:1, b) 0.5-10% by weight, preferably 1.2-6.5% by weight, in each case based on the amount of aluminate cement, of polyol, selected in particular from glycerol or erythritol, c) 10-80% by weight, preferably 25-75% by weight, more preferably 30-70% by weight of aggregates, in particular sand, and/or fillers, in particular fine calcium carbonate, and e) optionally additives selected from the group consisting of accelerators, retardants, flow aids, rheological aids, thickeners, pigments, biocides.

It is preferable that no glycerol is used when calcium sulfoaluminate cement is present.

A construction chemical composition according to the invention may in particular be a dry mortar. The construction chemical composition may be in the form of a 1-component composition. This has the advantage of avoiding errors due to incorrect dosing of components and/or poor mixing, for example at the construction site. The construction chemical composition may however also be in the form of a multi-component composition, for example in the form of a 2-component or 3-component composition. This can have the advantage of being able to tailor particular properties to the requirements at the place of use.

Such construction chemical compositions are referred to also as dry construction chemical compositions. Dry construction chemical compositions are accordingly in the present case those compositions that contain less than 1% by weight, preferably less than 0.1% by weight, based on the total weight of the dry composition, of water.

A reduced-shrinkage construction chemical composition according to the invention may additionally comprise water or be mixed with water.

According to particular embodiments, a construction chemical composition according to the invention contains water in a water/powder weight ratio of between 0.1-1.0, preferably 0.15-0.6, especially 0.18-0.4. The term powder refers to the total dry construction chemical composition as described above.

Water may be any available water, such as distilled water, purified water, tap water, mineral water, spring water, and well water. The use of waste water is possible only in situations where the composition of said waste water is known and where none of the impurities present therein are able to adversely affect the functionality of any other constituent of the composition of the present invention. The use of salt water is possible but—because of the high chloride content and associated risk of corrosion of steel reinforcements—not favored.

Typically, a dry construction chemical composition is not mixed with water until shortly before use. This is because on contact with water a dry construction chemical composition of the present invention begins to harden. It is therefore particularly preferable to first produce a dry construction chemical composition, especially a dry mortar, as described above and then to mix this dry construction chemical composition with water at or near the place of use.

There are no particular limitations on the methods and devices for mixing the dry construction chemical composition with water; these are known per se to the person skilled in the art. Mixing may be continuous, intermittent or discontinuous. Continuous mixing offers the advantage of high material throughput.

A construction chemical composition according to the invention may in particular be a wet mortar mixture. The consistency of the wet mortar mixture may vary over a wide range. The consistency may in particular be a sag-resistant, pasty mass. The consistency may however also be a free-flowing or self-leveling mass. In particular, the consistency at the place of use may be adjusted by adding an appropriate amount of water to a dry construction chemical composition.

When hardened at 20° C. and 50-75% relative humidity and on a test specimen having dimensions of 160×40×10 mm, the construction chemical composition according to the invention preferably exhibits shrinkage after 28 days of not more than 0.5 mm/m as a result of it hardening. In the context of the present invention, a positive value for shrinkage indicates expansion of the hardened composition by the indicated value, whereas negative shrinkage indicates contraction of the composition by the indicated value. In the context of the present invention, the shrinkage is to be determined in accordance with standard EN 13872:2004-04.

It is also preferable that the dry construction chemical composition or the construction chemical composition mixed with water has a total TVOC content of not more than 0.5 µg toluene equivalents/g, in particular of not more than 0.2 µg toluene equivalents/g (TVOC: total volatile organic compounds). The TVOC content is determined according to the GEV Emicode test method of 4.4.2019.

In addition, it is preferable that the construction chemical composition when mixed with water already has a relatively high compressive strength and flexural strength after just a short time, for example one day (24 h) under standard conditions (20° C., 50% RH, 1013 mbar).

In a further aspect, the present invention relates to the use of a reduced-shrinkage construction chemical composition as described above as a cementitious tile adhesive, self-leveling or sag-resistant spackling compound, grouting material, self-leveling base, self-leveling layer, plaster, repair mortar, joint mortar, masonry mortar or concrete, screed, leveling compound for indoor or outdoor areas, thin-bed mortar, waterproofing mortar, waterproofing slurry, anchoring mortar or isolating membrane.

In particular, the present invention relates to the use of a reduced-shrinkage construction chemical composition as described above as a leveling compound, self-leveling or sag-resistant spackling compound, screed, cementitious tile adhesive or joint mortar.

A cementitious tile adhesive conforms in particular to the standard EN 12004-1. A joint mortar conforms in particular to the standard EN 13888. A self-leveling base or a self-leveling covering conforms in particular to the standard EN 13813. A plaster conforms in particular to the standard EN 998-1. A repair mortar conforms in particular to the standard EN 1504-3. A masonry mortar or concrete conforms in particular to the standards EN 998-2 and EN 206-1. A screed conforms in particular to the standard EN 13813. A thin-bed mortar conforms in particular to the standard EN 998-2. A waterproofing mortar conforms in particular to the standard EN 1504-2. An anchoring mortar conforms in particular to the standard EN 1504-6.

According to a preferred embodiment, a construction chemical composition of the present invention is used as part or as a cementitious tile adhesive. According to another preferred embodiment, a construction chemical composition of the present invention is thus used as part or as a masonry mortar or concrete. According to another preferred embodiment, a construction chemical composition of the present invention is used as part or as a screed. According to another preferred embodiment, a construction chemical composition of the present invention is thus used as part or as a self-leveling base or self-leveling covering.

Typically, the uses relate to a water-containing construction chemical composition or construction chemical composition mixed with water, i.e. a construction chemical composition that also contains water in a water/powder ratio of between 0.1-1.0, preferably 0.15-0.6, especially 0.18-0.4.

Construction chemical compositions according to the invention may be used in a process for applying a building material to a substrate that comprises the following steps:

mixing the dry construction chemical compositions with water to form a flowable or pasty composition, applying the flowable or pasty composition to a substrate, and hardening of the composition.

The free-flowing or pasty composition is here preferably self-levelling. In addition, a flowable or pasty composition produced in this way using the process according to the invention is preferably pumpable, so that it can be conveyed to any desired location with conventional pumps known and used in the field of technology.

The present invention is not subject to any relevant restrictions as regards the substrate onto which the flowable or pasty composition can be applied. The substrate should however be such that the composition adheres firmly to the substrate after drying. Suitable substrates, besides all types of standard substrates such as mineral screeds or dry screeds, are especially floor coverings such as wooden floorboards, fixed parquet, chipboard, wood-cement boards, old substrates with ceramic coverings, old substrates based on screeds of all kinds, or concrete, as well as substrates that readily deform, such as bituminous asphalt screed. A particularly suitable substrate is an anhydrite screed.

It is possible to apply the construction chemical composition of the present invention that contains water, or is mixed with water, by any means known to the person skilled in the art. According to one embodiment, the water-containing construction chemical composition or construction chemical composition mixed with water is applied with a trowel, brush or roller. According to one embodiment, the water-containing construction chemical composition or construction chemical composition mixed with water is applied by an injection or spraying process. According to another embodiment, the water-containing construction chemical composition or construction chemical composition mixed with water is poured from a suitable container.

Injection or spraying processes have the advantage that the application can be carried out very quickly and continuously. Suitable devices for such processes are known to the person skilled in the art. According to a particularly preferred embodiment, an injection or spraying process is carried out continuously. Such a process is characterized in that water and a dry construction chemical composition of the present invention are continuously mixed and continuously supplied to an injection head or spray head. This permits continuous injection or spray application.

A construction chemical composition of the present invention that contains water, or is mixed with water, may be applied in a single layer or in multiple layers. Application in multiple layers has the advantage that a higher total layer thickness can be achieved.

A primer may be applied to the substrate prior to application of a construction chemical composition of the present invention that contains water or is mixed with water. It is also possible, during a multilayer application, to apply a primer between different layers of a construction chemical composition of the present invention that contains water or is mixed with water.

In another aspect, the present invention relates to the hardened bodies obtained once a construction chemical composition of the present invention that contains water, or is mixed with water, has set and hardened. The present invention relates in particular to a hardened cementitious tile adhesive, a hardened joint mortar, a hardened self-leveling substrate, a hardened self-leveling layer, a hardened plaster, a hardened repair mortar, a hardened masonry thin-joint mortar or concrete, a hardened screed, a hardened wall filler, a hardened non-shrink joint mortar, a hardened thin-joint mortar, a hardened waterproofing mortar, a hardened anchoring mortar or a hardened isolating membrane, wherein the cementitious tile adhesive, the grouting material, the self-leveling substrate, the self-leveling covering, the plaster, the repair mortar, the masonry thin-joint mortar or concrete, the screed, the wall leveling mortar, the non-shrink mortar, the thin-joint mortar, the waterproofing mortar, the anchoring mortar or the isolating membrane comprises or consists of a construction chemical composition according to the invention.

In a further aspect, the present invention relates to a method for reducing the shrinkage of a construction chemical composition based on a hydraulic binder comprising a) aluminate cement and/or calcium sulfoaluminate cement, b) calcium sulfate, and c) optionally portland cement, characterized in that the method comprises or consists of the following steps:

(i) adding at least one polyol having a functionality of 4 or less and an OH group density of at least 0.033 mol OH per g polyol to the construction chemical composition, (ii) adding water to the dry construction chemical composition, (iii) mixing the construction chemical composition (iv) applying the construction chemical composition, and (v) optionally hardening the construction chemical composition.

If a liquid polyol, in particular glycerol, is used, it is possible and in certain cases advantageous when the liquid polyol is applied to a solid carrier before addition. In particular, it may be preferable for the liquid polyol to be applied to an aggregate, for example sand, or to a filler, for example calcium carbonate, before addition. This makes it possible to add the liquid polyol in a pulverulent form.

Steps (i), (ii), and (iii) may in particular be carried out in any order. This means that the at least one polyol may be added to the dry construction chemical composition or may be added to the composition made up with water. The method preferably comprises a plurality of mixing steps. In particular, it can be useful to include a mixing step after the addition of polyol and a further mixing step after the addition of water. This is particularly the case when polyol is added to the dry construction chemical composition.

The construction chemical composition is here in particular as defined above. Very particularly preferably, the construction chemical composition comprises, in each case based on the total dry mass of the construction chemical composition, a) 5-70% by weight, preferably 30-65% by weight, of a hydraulic binder comprising
  a1) aluminate cement and/or calcium sulfoaluminate cement,
  a2) calcium sulfate, and
  a3) optionally portland cement,
b) at least one polyol having a functionality of 4 or less and an OH group density of at least 0.033 mol OH per g polyol,
c) 10-80% by weight, preferably 25-75% by weight, more preferably 30-70% by weight, of aggregates, in particular sand, and/or fillers, in particular fine calcium carbonate, and
e) optionally additives selected from the group consisting of accelerators, retardants, flow aids, rheological aids, thickeners, pigments, and biocides.

In a particular embodiment, the reduced-shrinkage construction chemical composition consists, in each case based on the total dry mass of the construction chemical composition, of a) 5-70% by weight, preferably 30-65% by weight, of a hydraulic binder comprising
  a1) aluminate cement and/or calcium sulfoaluminate cement,
  a2) calcium sulfate, and
  a3) optionally portland cement,
b) at least one polyol having a functionality of 4 or less and an OH group density of at least 0.033 mol OH per g polyol,
c) 10-80% by weight, preferably 25-75% by weight, more preferably 30-70% by weight, of aggregates, in particular sand, and/or fillers, in particular fine calcium carbonate, and
e) optionally additives selected from the group consisting of accelerators, retardants, flow aids, rheological aids, thickeners, pigments, and biocides.

According to preferred embodiments, the method for reducing the shrinkage of a construction chemical composition relates to those compositions that comprise aluminate cement and portland cement and aluminate cement and portland cement are present in a weight ratio of aluminate cement to portland cement of 10:1 to 1:10, more preferably 4:1 to 1:5, very particularly preferably from 3:1 to 1:3, especially from 3:1 to 1:1.

According to preferred embodiments, the method for reducing the shrinkage of a construction chemical composition relates to those compositions that contain calcium sulfate in a proportion in the hydraulic binder of 1-80% by weight, preferably 10-75% by weight, in each case based on the total dry mass of the binder.

According to preferred embodiments, polyol, selected in particular from glycerol or erythritol, is used in a method for reducing the shrinkage of a construction chemical composition in an amount of at least 0.5% by weight, preferably at least 1.2% by weight, based on the amount of aluminate cement and/or calcium sulfoaluminate cement.

According to preferred embodiments, polyol, selected in particular from glycerol or erythritol, is used in a method for reducing the shrinkage of a construction chemical composition in an amount of not more than 10% by weight, preferably not more than 6.5% by weight, based on the amount of aluminate cement and/or calcium sulfoaluminate cement.

After mixing with water, a construction chemical composition of the present invention begins to set and harden. The setting and hardening of a construction chemical composition of the present invention that contains water, or is mixed with water, proceeds over time, this being accompanied by the development of physical properties such as compressive strength, flexural strength, etc. A construction chemical composition of the present invention that contains water, or is mixed with water, hardens at various temperatures. It is however preferable to harden a construction chemical composition of the present invention that contains water, or is mixed with water, at temperatures of between +4° C. and +50° C., preferably between +5° C. and +35° C. It is highly preferable to harden a construction chemical composition of the present invention that contains water, or is mixed with water, at a pressure of approx. 1023 mbar. It is also possible to set and harden a construction chemical composition of the present invention that contains water, or is mixed with water, at relatively high temperatures and also under elevated pressure, for example in an autoclave. Setting and hardening are typically complete after 28 days. However, depending on the temperature, pressure, and humidity in particular, setting and hardening may already be complete after less than 28 days or take longer than 28 days.

The building material compositions according to the invention are elucidated in more detail hereinbelow with reference to exemplary embodiments. The examples are provided by way of illustration and are not intended to limit the present invention in any way.

EXEMPLARY EMBODIMENTS

Table 1 below contains an overview of the chemicals used.

TABLE 1

| Chemicals used | |
| --- | --- |
| OPC | CEM I 52.5 R |
| CAC | Calcium aluminate cement (Ternal RG from Imerys) |
| CSA | Calcium sulfoaluminate cement (Alicem from Italcementi) |
| $CaSO_4 \cdot \frac{1}{2}H_2O$ | Alphagips FG 100 (from Knauf) |
| Quartz sand | Quartz sand Haltern H35 (Quarzwerke) |
| $CaCO_3$ | Limestone powder (97.1% $CaCO_3$, D50 = 23.4 μm) |

TABLE 1-continued

| Chemicals used | |
| --- | --- |
| RDP | Redispersible polymer powder based on ethylene, vinyl acetate, vinyl versatate (minimum film formation T: +5° C.) |
| Glycerol | ACS reagent, ≥99.5% purity |
| Erythritol | Sigma-Aldrich (i-erythritol), >99% purity |
| Sorbitol | Sigma-Aldrich, >98% purity |
| Mannitol | Sigma-Aldrich, >98% purity |
| Pentaerythritol | Sigma-Aldrich, 99% purity |
| Additives | Mixture of flow agent (PCE), defoamer (mineral oil), thickener (cellulose ether), retardant (fruit acid), accelerator (lithium carbonate) |

Shrinkage was determined in accordance with standard EN 13872:2004-04. The tables that follow contain information on the hardening conditions and hardening time of the test specimens and on the dimensions of the test specimens used in each case. In the tables that follow, the change in the dimensions of the test specimen after the specified period of time is in each case shown, with positive values corresponding to expansion and negative values to shrinkage relative to the original dimensions. The maximum expansion L is the largest expansion that was measured over a period of 1 h to 28 d. The end value E corresponds to the change in dimensions after 28 days. The L/E ratios stated in the tables below were calculated from the values for the maximum expansion L and end value E in each case.

The deformation, as stated in Table 5, was determined on the basis EN 13872:2004-04.

TVOC (total volatile organic compounds) were determined according to the GEV Emicode test method of 4.4.2019.

Example 1

The inventive mixtures 1-1 to 1-4 and noninventive comparison mixtures V-1 and V-2 shown in Table 2 were prepared. For this, OPC, CAC, $CaSO_4 \cdot \frac{1}{2}H_2O$, quartz sand, $CaCO_3$, RDP, additives, and erythritol were weighed out in the amounts specified in Table 2 and intimately mixed until an optically homogeneous powder had formed. The specified amount of water was added to this dry mixture and it was mixed on an IKA stirrer at 600 rpm for 60 sec. The resulting mass was poured into prismatic molds of the dimensions shown in Table 2 and allowed to harden under the stated conditions. The shrinkage was measured after the times specified in Table 2.

TABLE 2

Compositions and results for example 1 (raw materials in the compositions are specified in g)

| Raw material | V-1 | 1-1 | 1-2 | 1-3 | V-2 | 1-4 |
| --- | --- | --- | --- | --- | --- | --- |
| OPC | 0 | 0 | 0 | 0 | 23 | 23 |
| CSA | 18 | 18 | 18 | 18 | | |
| CAC | | | | | 8 | 8 |
| $CaSO_4 \cdot \frac{1}{2}H_2O$ | 46 | 46 | 46 | 46 | 4 | 4 |
| Quartz sand | 25.8 | 25.8 | 25.8 | 25.8 | 47 | 47 |
| $CaCO_3$ | 7.5 | 7.5 | 7.5 | 7.5 | 15 | 15 |
| RDP | 2 | 2 | 2 | 2 | 2.5 | 2.5 |
| Additives | 0.9 | 0.9 | 0.9 | 0.9 | 0.5 | 0.5 |
| Erythritol | | 0.1 | 0.25 | 0.50 | | 0.25 |
| Water | 22 | 22 | 22 | 25 | 18 | 18 |
| Shrinkage in samples 160 × 40 × 10 mm @ 20° C./55% RH [mm/m] | | | | | | |
| 1 h | +0.07 | −0.05 | −0.03 | −0.05 | −0.1 | −0.1 |
| 24 h | −0.05 | −0.3 | −0.05 | −0.1 | −0.25 | −0.15 |

TABLE 2-continued

Compositions and results for example 1 (raw materials in the compositions are specified in g)

| Raw material | V-1 | 1-1 | 1-2 | 1-3 | V-2 | 1-4 |
| --- | --- | --- | --- | --- | --- | --- |
| 7 d | −0.2 | −0.45 | −0.31 | −0.35 | −0.42 | −0.31 |
| 28 d (end value E) | −0.25 | −0.46 | −0.33 | −0.38 | −0.43 | −0.31 |
| Max. expansion L | +0.18 | −0.05 | −0.03 | −0.05 | −0.1 | −0.1 |
| Ratio L/E | 0.72 | 0.11 | 0.09 | 0.13 | 0.23 | 0.32 |
| Shrinkage in samples 160 × 40 × 10 mm @ 20° C./75% RH [mm/m] | | | | | | |
| 1 h | +0.13 | +0.05 | −0.01 | +0.01 | −0.02 | −0.02 |
| 24 h | +0.22 | +0.25 | +0.4 | +0.1 | −0.05 | −0.02 |
| 7 d | +0.17 | +0.2 | +0.23 | +0.21 | −0.25 | −0.22 |
| 28 d | +0.08 | +0.15 | +0.14 | +0.15 | −0.36 | −0.35 |
| Max. expansion L | +0.29 | +0.25 | +0.4 | +0.21 | −0.02 | −0.02 |
| Ratio L/E | 3.63 | 1.67 | 2.85 | 1.4 | 0.06 | 0.06 |

As can be seen from the results in Table 2, the use of erythritol results in a reduction in the L/E ratio. A low L/E ratio means little deformation of the hardening construction chemical composition. This is desirable, since it allows for example the formation of cracks to be avoided. In the case of construction chemical compositions having a content of portland cement (i.e. based on ternary binders), the L/E ratio is not improved in all cases (example 1-4 versus V-2). However, in these cases the shrinkage behavior is still reduced overall.

Example 1a

The slump of mixtures V-1 and 1-2 from example 1 was measured on the basis of standard EN 12350-5 3 minutes and 20 minutes after having been made up with water. In addition, the setting start and end times were measured (according to the Vicat method as described in standard EN 196). These measurements were in each case recorded with a freshly produced powder and with a powder that had been stored in an open container for 7 d at 20° C./55% RH. Table 3 below gives an overview of the results.

TABLE 3

Measurement results for experiments V-1 (noninventive) and 1-2 (inventive).

| Property | V-1 | 1-2 |
| --- | --- | --- |
| Slump after 3 and after 20 min [cm] Powder freshly produced | 31.5 and 31.0 | 32.3 and 31.8 |
| Slump after 3 and after 20 min [cm] Powder stored | 33.8 and 30.5 | 33.0 and 33.0 |
| Factor of increase in slump between 0 and 7 d | 1.07 and 0.98 | 1.02 and 1.04 |
| Setting time, initial and final [min] Powder freshly produced | 62 and 68 | 76 and 82 |
| Setting time, initial and final [min] Powder stored | 144 and 150 | 108 and 114 |
| Factor of increase in setting time between 0 and 7 d | 2.3 and 2.2 | 1.4 and 1.4 |

As can be seen from Table 3, an inventive construction chemical composition containing erythritol has better storage stability than the same composition without erythritol.

Example 1b

Mixtures V1-1 and V1-2 were produced. These correspond in their production and compositions to mixtures 1-2 from example 1. However, in V1-1 erythritol was replaced by sorbitol and in V1-2 erythritol was replaced by mannitol.

The setting times of mixtures V1-1 and V1-2 were measured as described in example 1a. Table 3' below gives an overview of the results.

TABLE 3'

| Setting times of mixtures 1-2 (inventive) and V1-1 and V1-2 (noninventive) | | | |
|---|---|---|---|
| Setting time | 1-2 | V1-1 | V1-2 |
| Initial [min] | 76 | >180 | >180 |
| Final [min] | 82 | >180 | >180 |

As can be seen from Table 3', the use of the noninventive polyols sorbitol and mannitol results in clear retardation of setting.

Example 2

The inventive mixtures 2-1 to 2-4 and noninventive comparison mixtures V-3 and V-4 shown in Table 4 were prepared. For this, OPC, CAC, $CaSO_4 \cdot \frac{1}{2}H_2O$, quartz sand, $CaCO_3$, RDP, additives, and glycerol were weighed out in the amounts specified in Table 4 and intimately mixed until an optically homogeneous powder had formed. The specified amount of water was added to this dry mixture and it was mixed on an IKA stirrer at 600 rpm for 60 sec. The resulting mass was poured into prismatic molds of the dimensions shown in Table 4 and allowed to harden under the stated conditions. The shrinkage was measured after the times specified in Table 4.

TABLE 4

| Compositions and results for example 2 (raw materials in the compositions are specified in g) | | | | | | |
|---|---|---|---|---|---|---|
| Raw material | V-3 | 2-1 | 2-2 | V-4 | 2-3 | 2-4 |
| OPC | 23 | 23 | 23 | 20 | 20 | 20 |
| CAC | 8 | 8 | 8 | 20 | 20 | 20 |
| $CaSO_4 \cdot \frac{1}{2}H_2O$ | 4 | 4 | 4 | 10.4 | 10.4 | 10.4 |
| Quartz sand | 46.7 | 46.7 | 46.7 | 29.5 | 29.5 | 29.5 |
| $CaCO_3$ | 15 | 15 | 15 | 17.5 | 17.5 | 17.5 |
| RDP | 2.4 | 2.4 | 2.4 | 2 | 2 | 2 |
| Additives | 0.6 | 0.6 | 0.6 | 0.9 | 0.9 | 0.9 |
| Glycerol | | 0.2 | 0.5 | | 0.2 | 0.5 |
| Water | 18 | 18 | 18 | 23.5 | 23.5 | 23.5 |
| Shrinkage in samples 160 × 40 × 10 mm @ 20° C./55% RH [mm/m] | | | | | | |
| 1 h | −0.08 | −0.06 | 0 | +0.03 | +0.01 | +0.01 |
| 24 h | −0.19 | −0.08 | 0 | −0.12 | −0.09 | −0.03 |
| 7 d | −0.42 | −0.34 | −0.25 | −0.39 | −0.42 | −0.29 |
| 28 d | −0.43 | −0.35 | −0.25 | −0.45 | −0.49 | −0.35 |
| Max. expansion L | −0.08 | −0.06 | 0 | +0.03 | +0.01 | +0.01 |
| Ratio L/E | 0.18 | 0.17 | 0 | 0.07 | 0.02 | 0.03 |
| Shrinkage in samples 160 × 40 × 10 mm @ 20° C./75% RH [mm/m] | | | | | | |
| 1 h | −0.03 | 0 | 0 | +0.08 | +0.06 | n.m. |
| 24 h | −0.08 | −0.02 | −0.02 | −0.01 | +0.01 | n.m. |
| 7 d | −0.24 | −0.06 | −0.06 | −0.19 | −0.19 | n.m. |
| 28 d | −0.51 | −0.39 | −0.21 | −0.35 | −0.33 | n.m. |
| Max. expansion L | −0.03 | 0 | 0 | +0.08 | +0.06 | n.m. |
| Ratio L/E | 0.06 | 0 | 0 | 0.23 | 0.18 | n.m. | n.m.: not measured

From the results in Table 4 it is clear that in a construction chemical composition based on a hydraulic binder comprising aluminate cement and portland cement in a ratio of portland cement to aluminate cement of 2.9:1, dosing with as little as 2.5% by weight of glycerol, based on the amount of aluminate cement, is sufficient to achieve a clear reduction in shrinkage (compare example 2-1 with V-3). Dosing with 5% by weight of glycerol reduces shrinkage to an even greater extent (example 2-2). At a ratio of aluminate cement to portland cement of 1:1, dosing with 1.0% by weight of glycerol, based on the amount of aluminate cement, is not sufficient to bring about a reduction in shrinkage. On the other hand, dosing with 2.5% by weight brings about a considerable reduction in the shrinkage of this construction chemical composition too (compare examples 2-2 and 2-4 and also V-4). The L/E ratios too are in each case lower for the inventive construction chemical compositions than for the comparison mixtures.

Example 2a

A composition as in example 2-1, but containing 35% by weight of portland cement CEM I 42.5 R and without aluminate cement and also without $CaSO_4 \cdot \frac{1}{2}H_2O$ was produced. This mixture contained 0.2% by weight of glycerol. Just 30 seconds after adding the water, the mixture could no longer be processed and production of test specimens for the measurement of shrinkage was not possible. In this portland cement-based composition, glycerol acted as a powerful accelerator.

Example 3

The inventive mixtures 3-1 to 3-4 and noninventive comparison mixtures V-5 and V-6 shown in Table 5 were prepared. For this, OPC, CAC, $CaSO_4 \cdot \frac{1}{2}H_2O$, quartz sand, $CaCO_3$, RDP, additives, and glycerol were weighed out in the amounts specified in Table 5 and intimately mixed until an optically homogeneous powder had formed. The specified amount of water was added to this dry mixture and it was mixed on an IKA stirrer at 600 rpm for 45 sec. The resulting mass was poured into prismatic molds of the dimensions shown in Table 5 and allowed to harden under the stated conditions. The shrinkage was measured after the times specified in Table 5.

TABLE 5

| Compositions and results for example 3 (raw materials in the compositions are specified in g) | | | | | | |
|---|---|---|---|---|---|---|
| Raw material | V-5 | 3-1 | 3-2 | V-6 | 3-3 | 3-4 |
| OPC | 13.8 | 13.8 | 13.8 | 5.2 | 5.2 | 5.2 |
| CAC | 41.5 | 41.5 | 41.5 | 25.5 | 25.5 | 25.5 |
| $CaSO_4 \cdot \frac{1}{2}H_2O$ | 9.3 | 9.3 | 9.3 | 10.5 | 10.5 | 10.5 |
| Quartz sand | 27.5 | 27.5 | 27.5 | 55 | 55 | 55 |
| RDP | 7 | 7 | 7 | 2.8 | 2.8 | 2.8 |
| Additives | 1 | 1 | 1 | 1 | 1 | 1 |
| Glycerol | | 0.2 | 0.5 | | 0.2 | 0.5 |
| Water | 28 | 28 | 28 | 31.5 | 31.5 | 31.5 |
| Shrinkage in samples 160 × 40 × 40 mm @ 20° C./75% RH [mm/m] | | | | | | |
| 1 h | −0.03 | −0.02 | −0.01 | n.m. | n.m. | n.m. |
| 24 h | −1.3 | −1.1 | −0.4 | n.m. | n.m. | n.m. |
| 7 d | −2.7 | −2.10 | −2.5 | n.m. | n.m. | n.m. |
| 28 d | −3.5 | −4.3 | −3.1 | n.m. | n.m. | n.m. |
| Max. expansion L | −0.03 | −0.02 | −0.01 | n.m. | n.m. | n.m. |
| Ratio L/E | 0.008 | 0.005 | 0.003 | n.m. | n.m. | n.m. |
| Deformation in samples 1000 × 50 × 10 mm @ 20° C./55% RH after 14 d [mm] | 43 | 41 | 27 | 14 | 12 | 10 |
| Deformation in samples 1000 × 50 × 10 mm @ 20° C./55% RH after 28 d [mm] | 43 | 42 | 28 | 14 | 13 | 10 | n.m.: not measured

From the results in Table 5 it is clear that in a construction chemical composition based on a hydraulic binder comprising aluminate cement and portland cement in a ratio of aluminate cement to portland cement of 3:1, dosing with as little as 0.5% by weight of glycerol, based on the amount of aluminate cement, is not sufficient to achieve a reduction in shrinkage (compare example 3-1 with V-5). On the other hand, dosing with 1.2% by weight of glycerol reduces shrinkage significantly (example 3-2). This becomes particularly clear from the measured deformation. At a ratio of portland cement to aluminate cement of 1:5, dosing with 0.8% by weight of glycerol, based on the amount of aluminate cement, is likewise not sufficient to bring about a significant reduction in shrinkage (compare example 3-3 with V-6). On the other hand, dosing with 2% by weight brings about a considerable reduction in the shrinkage of this construction chemical composition too (compare examples 3-3 and 3-4 and also V-6). The L/E ratios too are in each case lower for the inventive construction chemical compositions than for the comparison mixtures.

Example 4

Table 6 below gives an overview of the measured TVOC values for a leveling compound, which was classified as Emicode EC1+ in the made-up state with water and after hardening for 3 days and for 28 days. In addition, Table 6 gives measured TVOC values of polyol selected from glycerol or erythritol and of two commercial shrinkage-reducing agents. The two commercial shrinkage-reducing agents and erythritol were measured both as the bulk substance (powder) and dissolved in water.

TABLE 6

| TVOC measurement results | | | |
|---|---|---|---|
| | TVOC [μg toluene equivalent/g sample] | | |
| Sample | Low boilers | Medium boilers | High boilers |
| EC1+ leveling compound | 0.15 | 0.09 | 0 |
| Hardening for 3 d | 0 | 0 | 0 |
| Hardening for 28 d | 0.06 | 0 | 0 |
| Glycerol | 0 | 0.40 | 0 |
| Erythritol | 0 | 0 | 0 |
| Erythritol (50% by weight dissolved in H₂O) | 0 | 0 | 0 |
| Shrinkage-reducing agent 1 | 0.64 | 2.51 | 0.28 |
| Shrinkage-reducing agent 1 (50% by weight dissolved in H₂O) | 0.07 | 1.62 | 0.47 |
| Shrinkage-reducing agent 2 | 0.84 | 42.67 | 0 |
| Shrinkage-reducing agent 2 (50% by weight dissolved in H₂O) | 0.35 | 62.92 | 0 |

Shrinkage-reducing agent 1: Sitren ® SRA P270
Shrinkage-reducing agent 2: Pentachem Pentamix EX3

From the results in Table 6, it can be seen that glycerol releases substantially lower levels of TVOC than commonly used commercial shrinkage reducers. Erythritol does not release any TVOC at all. When using polyol selected from glycerol or erythritol in accordance with the present invention, it is therefore to be expected that construction chemical compositions will release virtually no additional TVOC.

The invention claimed is:

1. A method for reducing the shrinkage of a construction chemical composition based on a hydraulic binder, the method comprising
   (i) adding at least one polyol having a functionality of 4 or less and an OH group density of at least 0.033 mol OH per g polyol to the construction chemical composition, wherein the polyol is selected from erythritol,
   (ii) adding water to the dry construction chemical composition,
   (iii) mixing the construction chemical composition, and
   (iv) applying the construction chemical composition to a substrate,
   wherein the hydraulic binder comprises
   a) aluminate cement and/or calcium sulfoaluminate cement,
   b) calcium sulfate, and
   c) optionally portland cement.

2. The method as claimed in claim 1, wherein the hydraulic binder consists of the following constituents (in each case based on the total dry mass of the binder):
   a) aluminate cement and/or calcium sulfoaluminate cement,
   b) 1-80% by weight of calcium sulfate, and
   c) optionally portland cement.

3. The method as claimed in claim 1, wherein the hydraulic binder comprises aluminate cement and portland cement in a weight ratio of aluminate cement to portland cement of from 10:1 to 1:10.

4. The method as claimed in claim 1, wherein polyol is used in an amount of at least 0.5% by weight based on the amount of aluminate cement and/or calcium sulfoaluminate cement.

5. The method as claimed in claim 1, wherein polyol is used in an amount of not more than 10% by weight based on the amount of aluminate cement and/or calcium sulfoaluminate cement.

6. A method as claimed in claim 1, further comprising hardening the construction chemical composition.

7. A reduced-shrinkage construction chemical composition comprising
   a) a hydraulic binder comprising
      a1) aluminate cement and/or calcium sulfoaluminate cement,
      a2) calcium sulfate, and
      a3) optionally portland cement, and
   b) at least one polyol having a functionality of 4 or less and an OH group density of at least 0.033 mol OH per g polyol, wherein the polyol is selected from erythritol.

8. The reduced-shrinkage construction chemical composition as claimed in claim 7, wherein the construction chemical composition comprises 5-70% by weight based on the total mass of the construction chemical composition, of a hydraulic binder consisting of aluminate cement and/or calcium sulfoaluminate cement and also calcium sulfate.

9. The reduced-shrinkage construction chemical composition as claimed in claim 7, wherein the construction chemical composition comprises 5-70% by weight based on the total mass of the construction chemical composition, of a hydraulic binder consisting of aluminate cement and/or calcium sulfoaluminate cement, calcium sulfate, and portland cement.

10. The reduced-shrinkage construction chemical composition as claimed in claim 7, wherein polyol is used in an amount of at least 0.5% by weight based on the amount of aluminate cement and/or calcium sulfoaluminate cement.

11. The reduced-shrinkage construction chemical composition as claimed in claim 7, wherein polyol is used in an amount of not more than 10% by weight based on the amount of aluminate cement and/or calcium sulfoaluminate cement.

12. The reduced-shrinkage construction chemical composition as claimed in claim 7, wherein it comprises water or is mixed with water, wherein a water to powder weight ratio of between 0.1-1.0 is present.

13. The reduced-shrinkage chemical composition as claimed in claim 7, wherein the chemical composition is formulated for use as a cementitious tile adhesive, self-leveling or sag-resistant spackling compound, grouting material, self-leveling base, self-leveling layer, plaster, repair mortar, joint mortar, masonry mortar or concrete, screed, leveling compound for indoor or outdoor areas, thin-bed mortar, waterproofing mortar, waterproofing slurry, anchoring mortar or isolating membrane.

14. A hardened body obtained by the setting and hardening of a construction chemical composition as claimed in claim 12.

15. A reduced-shrinkage construction chemical composition comprising, in each case based on the total dry mass of the construction chemical composition,
  a) 5-70% by weight of a hydraulic binder comprising
    a1) aluminate cement and/or calcium sulfoaluminate cement,
    a2) calcium sulfate, and
    a3) optionally portland cement,
  b) at least one polyol having a functionality of 4 or less and an OH group density of at least 0.033 mol OH per g polyol, wherein the polyol is selected from erythritol,
  c) 10-80% by weight of aggregates, and
  e) optionally additives selected from the group consisting of accelerators, retardants, flow aids, rheological aids, thickeners, pigments, and biocides.

16. A method for reducing the shrinkage of a construction chemical composition based on a hydraulic binder, the method comprising
  (i) adding at least one polyol having a functionality of 4 or less and an OH group density of at least 0.033 mol OH per g polyol to the construction chemical composition, (ii) adding water to the dry construction chemical composition,
  (iii) mixing the construction chemical composition, and
  (iv) applying the construction chemical composition to a substrate,
wherein the hydraulic binder comprises
  a) aluminate cement,
  b) calcium sulfate, and
  c) portland cement,
wherein a weight ratio of aluminate cement to portland cement of from 10:1 to 1:1, and
wherein the at least one polyol is used in an amount of between 1.2% by weight to 2% by weight, based on the amount of aluminate cement.

17. A reduced-shrinkage construction chemical composition comprising, in each case based on the total dry mass of the construction chemical composition,
  a) 5-70% by weight of a hydraulic binder comprising
    a1) aluminate cement,
    a2) calcium sulfate, and
    a3) portland cement,
  b) at least one polyol having a functionality of 4 or less and an OH group density of at least 0.033 mol OH per g polyol,
  c) 10-80% by weight of aggregates, and
  e) optionally additives selected from the group consisting of accelerators, retardants, flow aids, rheological aids, thickeners, pigments, and biocides,
wherein a weight ratio of aluminate cement to portland cement of from 10:1 to 1:1, and
wherein the at least one polyol is used in an amount of between 1.2% by weight to 2% by weight, based on the amount of aluminate cement.

* * * * *